(12) United States Patent
Heider et al.

(10) Patent No.: US 6,749,964 B2
(45) Date of Patent: Jun. 15, 2004

(54) ACTIVE POSITIVE-ELECTRODE MATERIAL IN ELECTROCHEMICAL CELLS, AND PROCESS FOR THE PRODUCTION OF THESE MATERIALS

(75) Inventors: Lilia Heider, Riedstadt (DE); Udo Heider, Riedstadt (DE); Natascha Lotz, Erzhausen (DE); Matthias Rothenburger, Mainz (DE)

(73) Assignee: Merck Patent Gesellschaft Mit Beschränkter Haftung, Darmstadt (DE)

( * ) Notice: Subject to any disclaimer, the term of this patent is extended or adjusted under 35 U.S.C. 154(b) by 0 days.

(21) Appl. No.: 09/821,683

(22) Filed: Mar. 30, 2001

(65) Prior Publication Data

US 2002/0172860 A1 Nov. 21, 2002

(30) Foreign Application Priority Data

Mar. 31, 2000 (DE) .......................... 100 16 024

(51) Int. Cl.$^7$ ............................................. H01M 4/48
(52) U.S. Cl. ............................. 429/218.1; 429/231.95; 29/623.1
(58) Field of Search ...................... 429/218.1; 29/623.1

(56) References Cited

U.S. PATENT DOCUMENTS

| | | |
|---|---|---|
| 3,883,368 A | 5/1975 | Kordesch et al. |
| 3,945,847 A | 3/1976 | Kordesch et al. |
| 4,028,215 A | 6/1977 | Lewis et al. |
| 4,072,586 A | 2/1978 | De Nora et al. |
| 4,221,853 A | 9/1980 | Tye et al. |
| 4,243,503 A | 1/1981 | Lieb et al. |
| 4,405,699 A | 9/1983 | Kruger |
| 4,422,917 A | 12/1983 | Hayfield |
| 4,451,543 A | 5/1984 | Dzieciuch et al. |
| 5,153,081 A | 10/1992 | Thackeray et al. |
| 5,156,934 A | 10/1992 | Kainthia et al. |
| 5,342,712 A | 8/1994 | Mieczkowska et al. |
| 5,419,986 A | 5/1995 | Kainthla et al. |
| 5,532,085 A | 7/1996 | Davis et al. |
| 5,599,644 A | 2/1997 | Swierbut et al. |
| 5,658,693 A | 8/1997 | Thackeray et al. |
| 5,674,644 A | 10/1997 | Nazri |
| 5,698,342 A | 12/1997 | Klein |
| 5,744,266 A | 4/1998 | Nunome et al. |
| 5,783,328 A | 7/1998 | Wang |
| 6,030,517 A * | 2/2000 | Lincot .................. 205/333 |
| 6,129,902 A * | 10/2000 | Sakamoto et al. ........... 423/594 |
| 6,228,904 B1 * | 5/2001 | Yadav .................. 523/210 |

FOREIGN PATENT DOCUMENTS

| | | | |
|---|---|---|---|
| DE | 19641970 | 4/1998 | |
| EP | 0 747 982 | 11/1996 | |
| FR | 2418965 | 9/1979 | |
| JP | 57090872 | 6/1982 | |
| JP | 410255786 | * 9/1998 | ............ H01M/4/48 |
| JP | 2000 040512 | * 2/2000 | ............ H01M/4/58 |
| JP | 2001 313030 | * 11/2001 | ............ H01M/4/38 |
| WO | 92/17910 | 10/1992 | |
| WO | 96/38866 | 12/1996 | |
| WO | 97/13285 | 4/1997 | |

OTHER PUBLICATIONS

European Patent Office—Patent Abstract of Japan, Publication No. 57090872 of May 6, 1982.

* cited by examiner

*Primary Examiner*—Mark Ruthkosky
(74) *Attorney, Agent, or Firm*—Millen, White, Zelano & Branigan, P.C.

(57) ABSTRACT

The invention relates to novel materials based on coated metal particles for use as active positive-electrode material in electrochemical cells.

5 Claims, No Drawings

ACTIVE POSITIVE-ELECTRODE MATERIAL IN ELECTROCHEMICAL CELLS, AND PROCESS FOR THE PRODUCTION OF THESE MATERIALS

The invention relates to novel materials based on coated metal cores, such as, for example, Sb, Bi, Cd, In, Pb, Ga or tin particles, or alloys thereof, for use as active positive-electrode material in electrochemical cells.

Lithium ion batteries are amongst the most promising systems for mobile applications. The areas of application extend from high-quality electronic equipment (for example mobile telephones, camcorders) to batteries for electrically driven motor vehicles.

These batteries may include a negative electrode, a positive electrode, a separator and a non-aqueous electrolyte. The negative electrode is typically $Li(MrMe_z)_2O_4$, $Li(CoMe_z)O_2$, $Li(CoNi_xMe_z)O_2$ or other lithium intercalation and insertion compounds. Positive electrodes can consist of lithium metal, soft and hard carbons, graphite, graphitic carbons or other lithium intercalation and insertion compounds or alloy compounds. The electrolyte used can be a solution containing lithium salts, such as $LiPF_6$, $LiBF_4$, $LiClO_4$, $LiAsF6$, $LiCF_3SO_3$, $LiN(CF_3SO_2)_2$ or $LiC(CF_3SO_2)_3$ and mixtures thereof, in aprotic solvents.

In the lithium ion batteries currently commercially available, carbon is employed as positive electrode. However, this positive-electrode system has some problems. A considerable drop in capacity occurs in this system during the 1$^{st}$ cycle due to irreversible incorporation of lithium into the carbon structure. In addition, the cycle stability of the carbons and graphites available is unsatisfactory. Furthermore, there is the safety aspect that kinetic limitations can cause critical parameters. In order to reduce the irreversible loss in capacity in the 1$^{st}$ charging cycle, new systems are sought which replace, for example, the carbon positive electrode. A variety of efforts are being made here. The carbon materials are being replaced, for example, by oxidic materials or alloys. In Journal of Power Sources 75 (1998), Wolfenstine investigates the suitability of tin oxide/tin mixtures as positive-electrode material for lithium ion batteries. The irreversible loss of Li due to the formation of $Li_2O$ is said to be minimized by the preferred use of SnO over $SnO_2$. EP 0823741 describes tin mixed oxides doped with various metals. U.S. Pat. No. 5,654,114 also describes the use of tin oxides as positive-electrode material for secondary lithium ion batteries. All the systems investigated have the drawback that Li is converted into $Li_2O$. This means that a large amount of Li is bound, and therefore is not available for the electrochemical processes in the battery.

SUMMARY OF THE INVENTION

A feature of the present invention is to provide positive-electrode materials which offer higher capacitance compared with carbon. In addition, the aim is to minimize the irreversible loss of lithium and to achieve good cycle stability.

This feature according to the invention maybe achieved by the use of coated metal cores, such as, for example, Sb, Bi, Cd, In, Pb, Ga or tin particles, and alloys thereof, particularly preferably tin particles, which are used as positive-electrode material in electrochemical cells. The alloys can include all combinations of Sb, Bi, Cd, In, Pb, or Ga.

It has been found that defined metal-oxide layers can be applied to the metal or alloy core.

Surprisingly, it has been found that the coated metal or, alloy particles, in particular tin particles, have excellent electrochemical properties. The irreversible loss of lithium over the 1$^{st}$ cycle is significantly less than in the case of conventional oxidic positive-electrode materials.

The prior-art uses of tin oxides for positive-electrode materials have the problem of particle agglomeration. Surprisingly, it has been found that particles of defined diameter can be produced by the process according to the invention. The process according to the invention enables primary particles in the nm range (generally less than about 1 μm) and secondary particles having a diameter of less than about 10 μm to be produced. Generally, the secondary particles can range in diameter from about 0.01 μm–about 1.0 μm, preferably from about 0.1 μm–about 10 μm, and optionally from about 1 μm–about 10 μm. These small particles result in an increase in the active surface area.

It has been found that the defined coating of the primary particles with an oxide layer results in a defined oxygen content. This enables the formation of $Li_2O$ to be regulated.

It is possible to carry out single or multiple coatings with metal hydroxides or metal oxyhydroxides, which are then converted into the oxides by heat treatment.

The process for the production of the positive-electrode material is characterized in that a) a suspension or a sol of the metal or alloy core in urotropin is prepared, b) the suspension is emulsified with $C_5$–$C_{12}$-hydrocarbons, preferably benzine or petroleum ether, c) the emulsion is precipitated onto the metal or alloy cores, and d) the metal hydroxides or oxyhydrides are converted into the corresponding oxide by heating the system.

Although not wishing to be bound by any particular theory, it is believed that a metal hydroxide or an oxyhydroxide is formed at a); see e.g. hereinafter, Solution 1 of Example 1.

It has been found that tin, molybdenum, cerium, tungsten and antimony hydroxides or oxyhydroxides, which are converted into the oxides by heat treatment, are suitable for the coating. In the case of multiple coatings, the same oxide or different oxides may be used for the coating.

On use of the coated metal or alloy particles, in particular tin particles, as positive-electrode ,material in electrochemical cells, improved cyclability due to the build-up of defined metal-oxide layers has been observed. The materials according to the invention are; preferably suitable for use in electrochemical cells and batteries, particularly preferably in secondary lithium ion batteries.

The positive-electrode material according to the invention can be employed in secondary lithium ion batteries containing customary electrolytes. Examples of suitable electrolytes comprising conductive salts are those selected from the group consisting of $LiPF_6$, $LiBF_4$, $LiClO_4$, $LiAsF_6$, $LiCF_3SO_3$, $LiN(CF_3SO_2)_2$ and $LiC(CF_3SO_2)_3$, and mixtures thereof. The electrolytes may also comprise organic isocyanates (DE 199 44 603) for reducing the water content. The electrolytes may also comprise organic alkali metal salts (DE 199 10 968) as additive. Suitable are alkali metal borates of the general formula

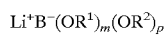

in which m and p are 0, 1, 2, 3 or 4, where m+p=4, and $R^1$ and $R^2$ are identical or different, are optionally bonded directly to one another via a single or double bond, are each, individually or together, an aromatic or aliphatic carboxylic, dicarboxylic or sulfonic acid radical, or are each, individually or together, an aromatic ring from the group consisting of phenyl, naphthyl, anthracenyl and phenanthrenyl, which may be unsubstituted or mono- to tetrasubstituted by A or Hal, or are each, individually or together, a heterocyclic aromatic ring from the group consisting of pyridyl, pyrazyl and bipyridyl, which may be unsubstituted or mono- to trisubstituted by A or Hal, or are each, individually or together, an aromatic hydroxy acid from the group consisting of aromatic hydroxycarboxylic acids and aromatic hydroxysulfonic acids, which may be unsubstituted or mono- to tetrasubstituted by A or Hal, and Hal is F, Cl or Br and A is alkyl having 1 to 6 carbon atoms, which may be mono- to trihalogenated.

Likewise suitable are alkali metal alkoxides of the general formula

in which R is an aromatic or aliphatic carboxylic, dicarboxylic or sulfonic acid radical, or is an aromatic ring from the group consisting of phenyl, naphthyl, anthracenyl and phenanthrenyl, which may be unsubstituted or mono- to tetrasubstituted by A or Hal, or is a heterocyclic aromatic ring from the group consisting of pyridyl, pyrazyl and bipyridyl, which may be unsubstituted or mono- to trisubstituted by A or Hal, or is an aromatic hydroxy acid from the group consisting of aromatic hydroxycarboxylic acids and aromatic hydroxysulfonic acids, which may be unsubstituted or mono- to tetrasubstituted by A or Hal, and Hal is F, Cl or Br and A is alkyl having 1 to 6 carbon atoms, which may be mono- to trihalogenated.

Lithium complex salts of the formula

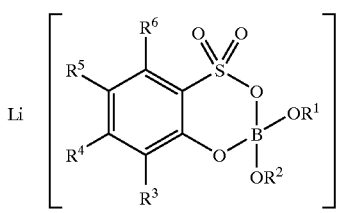

where.

$R^1$ and $R^2$ are identical or different, are optionally bonded directly to one another via a single or double bond, and are each, individually or together, an aromatic ring from the group consisting of phenyl, naphthyl, anthracenyl and phenanthrenyl, which may be unsubstituted or mono- to hexasubstituted by alkyl ($C_1$ to $C_6$), alkoxy groups ($C_1$ to C6) or halogen (F, Cl or Br), or are each, individually or together, an aromatic heterocyclic ring from the group consisting of pyridyl, pyrazyl and pyrimidyl, which may be unsubstituted or mono- to tetrasubstituted by alkyl ($C_1$ to $C_6$), alkoxy groups ($C_1$ to $C_6$) or halogen (F, Cl or Br), or are each, individually or together, an aromatic ring from the group consisting of hydroxybenzocarboxyl, hydroxynaphthalenecarboxyl, hydroxybenzosulfonyl and hydroxynaphthalenesulfonyl, which may be unsubstituted or mono- to tetrasubstituted by alkyl ($C_1$ to $C_6$), alkoxy groups ($C_1$ to $C_6$) or halogen (F, Cl or Br), $R^3$–$R^6$ may each, individually or in pairs and optionally bonded directly to one another via a single or double bond, have the following meanings:
1. alkyl ($C_1$ to $C_6$), alkoxy ($C_1$ to $C_6$) or halogen (F, Cl or Br)
2. an aromatic ring from the groups consisting of phenyl, naphthyl, anthracenyl and phenanthrenyl, which may be unsubstituted or mono- to hexasubstituted by alkyl ($Cl_1$ to $C_6$), alkoxy groups ($C_1$ to $C_6$) or halogen (F, Cl or Br), pyridyl, pyrazyl and pyrimidyl, which may be unsubstituted or mono- to tetrasubstituted by alkyl ($C_1$ to $C_6$), alkoxy groups ($C_1$ to $C_6$) or halogen (F, Cl or Br), which are prepared by the following process (DE 199 32 317):

a) chlorosulfonic acid is added to 3-, 4-, 5- or 6-substituted phenol in a suitable solvent, b) the intermediate from a) is reacted with chlorotrimethylsilane, and the reaction mixture is filtered and subjected to fractional distillation, c) the intermediate from b) is reacted with lithium tetramethoxyborate(1-) in a suitable solvent, and the end product is isolated therefrom, may also be present in the electrolyte.

The electrolytes may likewise comprise compounds of the following formula (DE 199 41 566):

where

Kt=N, P, As, Sb, S or Se,

A=N, P, P(O), O, S, S(O), $SO_2$, As, As(O), Sb or Sb(O), $R^1$, $R^2$ and $R^3$ are identical or different and are H, halogen, substituted and/or unsubstituted alkyl $C_nH_{2n+1}$, substituted and/or unsubstituted alkenyl having 1–18 carbon atoms and one or more double bonds, substituted and/or unsubstituted alkynyl having 1–18 carbon atoms and one or more triple bonds, substituted and/or unsubstituted cycloalkyl $C_mH_{2m-1}$, mono- or polysubstituted and/or unsubstituted phenyl, or substituted and/or unsubstituted heteroaryl, A can be included in $R^1$, $R^2$ and/or $R^3$ in various positions, Kt can be included in a cyclic or heterocyclic ring, the groups bonded to Kt may be identical or different, where n=1–18 m=3–7 k=0 or 1–6 l=1 or 2 in the case where x=1 and 1 in the case where x=0 x=0 or 1 y=1–4.

The process for the preparation of these compounds is characterized in that an alkali metal salt of the general formula

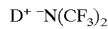 (II)

where $D^+$ is selected from the group consisting of the alkali metals, is reacted, in a polar organic solvent, with a salt of the general formula $$[([R^1(CR^2R^3)_k]_lA_x)_yKt]^+ {}^-E \quad (III)$$

where

Kt, A, $R^1$, $R^2$, $R^3$, k, l, x and y are as defined above, and
$^-E$ is $F^-$, $Cl^-$, $Br^-$, $I^-$, $BF_4^-$, $ClO_4^-$, $AsF_6^-$, $SbF_6^-$ or $PF_6^-$.

However, use can also be made of electrolytes comprising compounds of the general formula (DE 199 53 638)

$$X—(CYZ)_m—SO_2N(CR^1R^2R^3)_2$$

where

X is H, F, Cl, $C_nF_{2n+1}$, $C_nF_{2n-1}$ or $(SO_2)_kN(CR^1R^2R^3)_2$,

Y is H, F or Cl

Z is H, F or Cl $R^1$, $R^2$ and $R^3$ are H and/or alkyl, fluoroalkyl or cycloalkyl m is 0–9 and, if X=H, m≠0 n is 1–9 k is 0 if m=0 and k=1 if m=1–9, prepared by reacting partially or perfluorinated alkylsulphonyl fluorides with dimethylamine in organic solvents, and complex salts of the general formula (DE 199 51 804)

$$M^{x+}[EZ]^{y-}{}_{x/y}$$

in which x and y are 1, 2, 3, 4, 5 or 6

$M^{x+}$ is a metal ion

E is a Lewis acid selected from the group consisting of $BR^1R^2R^3$, $AlR^1R^2R^3$, $PR^1R^2R^3R^4R^5$, $AsR^1R^2R^3R^4R^5$ and $VR^1R^2R^3R^4R^5$, $R^1$ to $R^5$ are identical or different, are optionally bonded directly to one another via a single or double bond, and each, individually or together, have the following meanings:

a halogen (F, Cl or Br), an alkyl or alkoxy radical ($C_1$ to $C_8$), which can be partially or fully substituted by F, Cl or Br, an aromatic ring, optionally bonded via oxygen, from the group consisting of phenyl, naphthyl, anthracenyl and phenanthrenyl, which may be unsubstituted or mono- to hexasubstituted by alkyl ($C_1$ to $C_8$) or F, Cl or Br, an aromatic heterocyclic ring, optionally bonded via oxygen, from the group consisting of pyridyl, pyrazyl and pyrimidyl, which may be unsubstituted or mono- to tetrasubstituted by alkyl ($C_1$ to $C_8$) or F, Cl or Br, and Z is $OR^6$, $NR^6R^7$, $CR^6R^7R^8$, $OSO_2R^6$, $N(SO_2R^6)(SO_2R^7)$, $C(SO_2R^6)(SO_2R^7)(SO_2R^8)$ or $OCOR^6$, where $R^6$ to $R^8$ are identical or different, are optionally bonded directly to one another via a single or double bond and are each, individually or together, hydrogen or as defined for $R^1$ to $R^5$, prepared by reacting a corresponding boron or phosphorus Lewis acid/solvent adduct with a lithium or tetra-alkylammonium imide, methanide or triflate.

Borate salts (DE 199 59 722) of the general formula

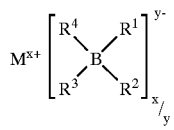

in which

M is a metal ion or a tetraalkylammonium ion, x and y are 1, 2, 3, 4, 5 or 6, $R^1$ to $R^4$ are identical or different and are alkoxy or carboxyl radicals ($C_1$–$C_8$), which are optionally bonded directly to one another via a single or double bond, may also be present. These borate salts are prepared by reacting lithium tetraalkoxyborate or a 1:1 mixture of lithium alkoxide with a borate with a suitable hydroxyl or carboxyl compound in a ratio of 2:1 or 4:1 in an aprotic solvent.

The positive-electrode materials according to the invention can likewise be employed in systems with polymer-coated lithium mixed oxide particles for negative-electrode materials (DE 19946066). The process for the production of lithium mixed oxide particles coated with one or more polymers is characterized in that the particles are suspended in a solvent, and the coated particles are then filtered off, dried and, if desired, calcined. The thickness of the polymer coating can range from about 0.01 μm–about 50 μm. Also, single or multiple coatings can be applied. The positive-electrode materials according to the invention can also be employed in systems with negative electrodes consisting of lithium mixed oxide particles coated with one or more metal oxides (DE 19922522). The process for the production of lithium mixed oxide particles coated with one or more metal oxides is characterized in that the particles are suspended in an organic solvent, a solution of a hydrolysable metal compound and a hydrolysis solution are added to the suspension, and the coated particles are then filtered off, dried and, if desired, calcined. The thickness of the polymer coating can range from about 0.03 μm–about 51 μm. Also, single or multiple coatings can be applied.

The positive-electrode materials according to the invention can likewise be employed in systems with negative electrodes consisting of lithium mixed oxide particles having a single or multiple coating with alkali metal compounds and metal oxides. The process for the production of these materials is characterized in that the particles are suspended in an organic solvent, an alkali metal salt compound suspended in an organic solvent is added, metal oxides dissolved in an organic solvent are added, a hydrolysis solution is added to the suspension, and the coated particles are subsequently filtered off, dried and calcined.

A general example of the invention is explained in greater detail below.

The starting compounds employed are 1–2 molar, preferably 2 molar, tin tetrachloride solutions. The concentration in the systems with Sb, Bi, Cd, In, Pb or Ga can likewise be in the abovementioned molar range, but can also be set lower or higher, preferably between 0.1 and 3 molar, preferably 2 molar. In the case of other oxidic coatings, the corresponding salt solutions, in particular chlorides of the elements Ce, Mo, W and Sb, or organic compounds of these elements can be employed. The solution is introduced into water with cooling and vigorous stirring. The white precipitate formed in the case of the Sn system is dissolved by warming. In the case of the other systems, precipitates may be formed, but are not generally observed. After the mixture has been cooled to room temperature, the amount of urea corresponding to the system is added and dissolved completely. The addition of the urea and the dissolution behaviour are system-dependent. Through addition of water, the dissolved concentration of the solution is set (see information above). The solution is cooled to temperatures between 0 and 10° C., preferably to 5–7° C. A 3.5 molar hexamethylenetetraamine solution is added in the ratio 1:1. The ratio also applies to the tin system and can be varied correspondingly in the case of other elements. It is also possible to use a 10% sub-stoichiometric amount or superstoichiometric amount of hexamethylenetetraamine. The mixture is stirred until the sol is clear. As carrier medium, tin, Sb, Bi, Cd, In, Pb, Ga or alloy particles, corresponding to the desired particle morphology of between 0 and 70%, are added.

Benzine (petroleum ether) is mixed with from 0.5 to 1.5%, preferably 0.7%, of commercially available emulsifiers, preferably with Span 80. The solution is warmed to temperatures between 30° C. and 70° C., preferably to 50° C. The solution described above is added with constant stirring. An ammonia solution is added to the resultant gel after from 3 to 20 minutes, preferably after 10 minutes, and the pH is stabilized so that no peptization of the gel occurs. After the organic phase has been decanted, the gel is washed with a suitable organic solvent, preferably with petroleum ether. In order to remove the emulsifier and organic impurities, detergents, preferably Triton, are subsequently added to the solution. The solution is filtered with suction, and the gel is washed with water and acetone.

The gel is dried and, if desired, subjected to heat treatment. If an SnO system is desired, drying to a maximum of 230° C., preferably at from 75° C. to 110° C., is sufficient. If an $SnO_2$ system is desired, the drying is followed by heat treatment. The heat treatment is carried out at temperatures between 350 and 1000° C., preferably at temperatures between 55 and 750° C., very particularly preferably at 650° C. The heat treatment is carried out for between 10 minutes and 5 hours, preferably between 90 minutes and 3 hours, very particularly preferably for 2 hours. The other oxidic systems are dried in the element-specific temperature ranges, and in this way the degree of oxidation is set.

Alternatively, the coated particles can also be produced by a precipitation method. This applies to all the elements mentioned above.

In the examples below, the tin system is described in greater detail.

Tin dichloride and/or tin tetrachloride are weighed out and dissolved in concentrated hydrochloric acid. Water is subsequently added to the solution.

Demineralized water is initially introduced and warmed to temperatures between 50° C. and 90° C., preferably to 75° C. After the carrier material, such as, for example, tin, has been added, a suitable pH is set by addition of hydrochloric acid. For an SnO system, a pH of between 9.5 and 10.5, preferably 10.0, is set. For an $SnO_2$ system, a pH of between 1.5 and 2.5, preferably of 2.1, is set. During the addition of a precipitation reagent from the group consisting of bases and water, preferably sodium hydroxide solution and ammonia, the pH is kept constant by addition of bases, preferably sodium hydroxide solution.

The precipitate is filtered off. The further work-up by, drying and, if desired, heat treatment is equivalent to the work-up in the sol/gel process.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents and publications, cited above or below and of corresponding German application No. DE 10016024.7, filed Mar. 31, 2000 is hereby incorporated by reference.

EXAMPLES

Example 1

Sol-gel Synthesis

Solution 1

250 ml of water are introduced into a four-necked flask with stirrer. 235 ml of $SnCl_4$ are added dropwise over the course of 90 minutes with vigorous stirring (350 rpm) and ice cooling. A white, insoluble precipitate forms which does not dissolve even after vigorous stirring for 3 days. The solution is warmed. Commencement of the dissolution process can be observed even at 50° C. The warming is carried out for 60 minutes and is terminated after the precipitate has dissolved completely and the boiling point (122° C.) has been reached. After the mixture has been cooled to room temperature, 600 g of urea are introduced and dissolved completely. The endothermic dissolution process gives a clear, high-viscosity solution, which is made up to a liter of solution with water.

Example 2

Solution 2

In order to prepare solution 2, 490 g of urotropin (hexamethylenetetraamine=HMT) are dissolved in 600 ml of water in a beaker on a magnetic stirrer and, when the slightly exothermic dissolution is complete, is made up to one liter of slightly greenish, cloudy solution. 38.5 ml of solution 1 (0.077 mol 11.6 g of $SnO_2$) are precooled in an ice bath for 4 minutes in a 250 ml beaker. 22 ml of solution 2 (0.077 mol) are added, and the mixture is stirred at 50° C. and 350 rpm (double-blade stirrer, 4 cm) for 3 minutes until the sol is clear. 2.9 g of tin are then added, and the mixture is stirred briefly. The mixture is grey in colour and is emulsified directly.

Example 3

Emulsion Formation 400 ml of benzine are added to 2.0 g of Span 80 (=0.74%) in a 1 liter beaker and mixed at 350 rpm. The temperature is set to 50° C. by means of a water bath.

The freshly prepared mixture described in Example 2 is added at 400 rpm and emulsified. After about 1.5 minutes, the gel forms.

After 10 minutes, 10 ml of 1% ammonia are added, and the mixture is emulsified at 400 rpm for a further 6 minutes, during which a moss-green gel forms.

Example 4

Phase Separation and Extraction

The organic benzine phase is decanted, washed with 2×35 ml of petroleum ether and separated.

In order to remove the emulsifier, the gel is mixed with 30 ml of Triton solution (concentration of the Triton solution can be matched to the system) and slurried for 6 minutes in the beaker. The mixture is filtered through a suction filter and washed with 200 ml of water. The residue is then covered with acetone and filtered with suction for precisely 15 minutes.

Example 5

Drying and Heat Treatment

The product is dried for one day in air and for one day in a drying cabinet at 60° C.

Appearance Before Heat Treatment green: beads with dark particles (chocolate muffin) ~40 μm
grey: beads with more dark particles
Heat treatment: programme: 20° C.→180 min→650° C./120 min→20° C.
Appearance: virtually unchanged
SEM studies show spherical particles with small cracks.

Example 6

Precipitation Reaction

Tin dichloride and tin tetrachloride are weighed out into a 500 ml round-bottomed flask and dissolved in concentrated hydrochloric acid. $H_2O$ is slowly added to the solution. Before commencement of the reaction, the metering pump is rinsed with precipitation solution.

2 l of demineralized water are introduced into a reaction vessel and heated to 75° C. When the reaction temperature has been reached, the carrier material tin is introduced. The pH is set to 2.1 by dropwise addition of 10% hydrochloric acid. The precipitation solution (tin solution) is metered in at the vessel base at a watering rate of 1–2 ml/min, while the pH is kept constant by addition of 32% sodium hydroxide solution. The sodium hydroxide solution here is metered in above the liquid level. A yellowish-white precipitate forms.

The precipitate is worked up as described in Example 5.

Example 7

Capacity

For the reference measurements, commercial $SnO_2$ was employed.

|  |  | Discharging [mAh/g] | Charging [mAh/g] | Irreversible capacity [%] |
| --- | --- | --- | --- | --- |
| Reference 1 | Cell 1 | 652 | 409 | 37.3 |
|  | Cell 2 | 595 | 325 | 45.4 |
| Reference 2 | Cell 1 | 481 | 314 | 34.7 |
|  | Cell 2 | 516 | 395 | 23.5 |
| Spherical | Cell 1 | 612 | 538 | 13.4 |
| $Sn/SnO_2$ | Cell 2 | 590 | 543 | 7.85 |

The measurable capacity of the spherical $Sn/SnO_2$ system is comparable to that of the commercial product. However, the irreversible capacity of the spherical $Sn/SnO_2$ system is significantly lower.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for the production of the positive-electrode material comprising a coated metal core of Sb, Bi, Cd, In, Pb, Ga, tin, or an alloy thereof, comprising
   a) preparing a suspension or sol of the metal or alloy core in urotropin;
   b) emulsifying the suspension with at least one $C_5$–$C_{12}$-hydrocarbon;
   c) precipitating the emulsion onto the metal or alloy core; and
   d) converting a metal hydroxide or an oxyhydroxide into the corresponding oxide by heating the system.

2. A process for the production of the positive-electrode material comprising a coated metal core of Sb, Bi, Cd, In, Pb, Ga, tin, or an alloy thereof, comprising preparing a suspension or sol of the metal or alloy core in urotropin.

3. An electrochemical cell comprising a negative electrode, a positive electrode, a separator and an electrolyte, wherein the positive electrode comprises a positive-electrode material comprising a coated metal core of Sb, Bi, Cd, In, Pb, Ga, tin, or an alloy thereof, wherein the negative electrode comprises an alkali metal borate of the formula:

$$Li^+B^-(OR^1)_m(OR^2)_p$$

wherein
   m and p are, 0, 1, 2, 3 or 4, where m+p=4, and
   $R^1$ and $R^2$ are, independently, identical or different,
   are optionally bonded directly to one another via a single or double bond,
   are each, individually or together, an aromatic or aliphatic carboxylic, dicarboxylic or sulfonic acid radical, or
   are each, individually or together, an aromatic ring of a phenyl, naphthyl, anthracenyl or phenanthrenyl group, which may be unsubstituted or mono- to tetrasubstituted by A or Hal, or
   are each, individually or together, a heterocyclic aromatic ring of a pyridyl, pyrazyl or bipyridyl group, which may be unsubstituted or mono- to trisubstituted by A or Hal, or
   are each, individually or together, an aromatic hydroxy acid of an aromatic hydroxycarboxylic acid or an aromatic hydroxysulfonic acid group, which may be unsubstituted or mono- to tetrasubstituted by A or Hal, and
   Hal is F, Cl or Br and
   A is alkyl having 1 to 6 carbon atoms, which may be mono- to trihalogenated.

4. An electrochemical cell comprising a negative electrode, a positive electrode, a separator and an electrolyte, wherein the positive electrode comprises a positive-electrode material comprising a coated metal core of Sb, Bi, Cd, In, Pb, Ga, tin, or an alloy thereof, wherein the negative electrode comprises an alkali metal alkoxide of the formula:

$$Li^+OR^-$$

in which R
   is an aromatic or aliphatic carboxylic, dicarboxylic or sulfonic acid radical, or is an aromatic ring of a phenyl, naphthyl, anthracenyl or phenanthrenyl group, which may be unsubstituted or mono- to tetrasubstituted by A or Hal, or is a heterocyclic aromatic ring of a pyridyl, pyrazyl or bipyridyl group, which may be unsubstituted or mono- to trisubstituted by A or Hal, or is an aromatic hydroxy acid of an aromatic hydroxycarboxylic acid of aromatic hydroxysulfonic acid group, which may be unsubstituted or mono- to tetrasubstituted by A or Hal, and Hal is F, Cl or Br and A is alkyl having 1 to 6 carbon atoms, which may be mono- to trihalogenated.

5. An electrochemical cell comprising a negative electrode, a positive electrode, a separator and an electrolyte, wherein the positive electrode comprises a positive-electrode material comprising a coated metal core of Sb, Bi, Cd, In, Pb, Ga, tin, or an alloy thereof, wherein the negative electrode comprises a lithium salt of formula:

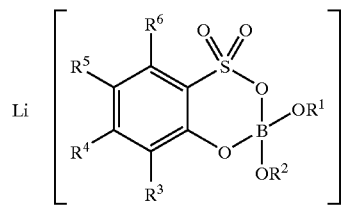

wherein $R^1$ and $R^2$ are, independently, identical or different, are optionally bonded directly to one another via a single or double bond, and are each, individually or together, an aromatic ring of a phenyl, naphthyl, anthracenyl or phenanthrenyl group, which may be unsubstituted or mono- to hexasubstituted by an alkyl group, an alkoxy group or halogen.

* * * * *